United States Patent
Tsirkin (10) Patent No.: US 9,684,529 B2
(45) Date of Patent: Jun. 20, 2017

(54) FIRMWARE AND METADATA MIGRATION ACROSS HYPERVISORS BASED ON SUPPORTED CAPABILITIES

(71) Applicant: Michael Tsirkin, Yokneam Yillit (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 399 days.

(21) Appl. No.: 13/773,338

(22) Filed: Feb. 21, 2013

(65) Prior Publication Data

US 2014/0237469 A1    Aug. 21, 2014

(51) Int. Cl.
*G06F 9/455* (2006.01)
*G06F 9/445* (2006.01)

(52) U.S. Cl.
CPC ............ *G06F 9/45558* (2013.01); *G06F 8/65* (2013.01); *G06F 9/45533* (2013.01); *G06F 2009/4557* (2013.01)

(58) Field of Classification Search
CPC ......... G06F 9/45558; G06F 2009/4557; G06F 9/45533; G06F 8/65
USPC .......................................................... 718/1
See application file for complete search history.

(56) References Cited

U.S. PATENT DOCUMENTS

| | | | | |
|---|---|---|---|---|
| 7,389,409 B2* | 6/2008 | Swanson | .................... | G06F 8/60 709/223 |
| 7,941,803 B2* | 5/2011 | Armstrong et al. | ............... | 718/1 |
| 8,046,270 B2* | 10/2011 | Wolcott | ................. | G06Q 30/06 705/26.1 |
| 8,209,686 B2* | 6/2012 | Diaz et al. | ......................... | 718/1 |
| 8,627,315 B2* | 1/2014 | Li | ........................ | G06F 9/45533 709/224 |
| 8,776,060 B2* | 7/2014 | Jess | ........................... | G06F 8/67 718/100 |
| 8,875,124 B2* | 10/2014 | Kuzmack et al. | ............. | 717/173 |
| 2005/0081024 A1* | 4/2005 | Khatri | ........................ | G06F 8/65 713/100 |
| 2005/0229173 A1* | 10/2005 | Mihm | ........................ | G06F 8/65 717/171 |
| 2007/0089111 A1* | 4/2007 | Robinson et al. | ................. | 718/1 |
| 2008/0250403 A1* | 10/2008 | Moon | ........................ | G06F 8/30 717/169 |
| 2008/0256530 A1* | 10/2008 | Armstrong | .......... | G06F 9/45533 717/174 |
| 2009/0070760 A1* | 3/2009 | Khatri | .................... | G06F 9/4856 718/1 |
| 2010/0131685 A1* | 5/2010 | Boecker | ................ | G06F 13/423 710/104 |
| 2011/0231839 A1* | 9/2011 | Bennett et al. | .................... | 718/1 |
| 2012/0159473 A1* | 6/2012 | Tsirkin | .............................. | 718/1 |

(Continued)

OTHER PUBLICATIONS

Microsoft Corporation, Computer Dictionary, 1997, Microsoft Press, 3rd ed.*

*Primary Examiner* — Benjamin Wu
(74) *Attorney, Agent, or Firm* — Lowenstein Sandler LLP (57) ABSTRACT

A system and methods are disclosed for employing firmware metadata and migrating firmware in virtualized environments. In accordance with one example, a hypervisor that is executed by a computer system obtains an address of a firmware program stored in a non-volatile memory of the computer system. The hypervisor also obtains metadata that specifies a set of capabilities of the firmware program, where the metadata is not accessible to any virtual machine hosted by the computer system.

20 Claims, 4 Drawing Sheets

(56) References Cited

U.S. PATENT DOCUMENTS

2012/0216183 A1* 8/2012 Mahajan .................. G06F 8/65
  717/170
2013/0179872 A1* 7/2013 Kuzmack ............... G06F 8/665
  717/173
2013/0227551 A1* 8/2013 Tsirkin .............................. 718/1

* cited by examiner

FIRMWARE AND METADATA MIGRATION ACROSS HYPERVISORS BASED ON SUPPORTED CAPABILITIES

TECHNICAL FIELD

This disclosure relates to computer systems, and more particularly, to the use of firmware metadata and migration of firmware in a virtualized environment.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and methods by which virtualized computer systems use metadata to specify capabilities of firmware programs (e.g., capabilities of the software code portion of firmware, such as rotation counter support, nested subroutine call support, exception support, timer resolution in milliseconds, maximum number of global variables, etc.). In accordance with one example, a hypervisor of a first virtualized computer system obtains the location of a firmware program stored in non-volatile memory, and the location of metadata that specifies a set of capabilities of the firmware program (e.g., a location in volatile memory, a file identifier of a file stored on disk, etc.). In one example, the metadata, which is accessed by the hypervisor, is not accessible to any virtual machines hosted by the first virtualized computer system. In addition to providing increased security, this approach allows the metadata to include attributes that may not conform with standard interfaces used by VMs to access firmware (for example, an attribute that specifies whether a specific version of the hypervisor is supported, etc.).

In response to a request to migrate the firmware program to a second virtualized computer system, the hypervisor of the first virtualized computer system transmits a query to the hypervisor of the second virtualized computer system inquiring whether that hypervisor supports the set of capabilities specified by the firmware metadata. If a response to the query indicates that the hypervisor of the second virtualized computer system supports the set of capabilities, one or more commands are issued to migrate the firmware program along with the firmware metadata to the second virtualized computer system. If the response indicates that the hypervisor of the second virtualized computer system does not support the set of capabilities, the migration request is denied.

Embodiments of the present disclosure thus provide a mechanism for associating metadata with firmware in virtualized computer systems, and automatically migrating the metadata along with the firmware to other systems. More particularly, the metadata specifies which capabilities are required to support the firmware, thereby enabling virtualized computer systems to use, migrate, and make decisions about firmware at the hypervisor level.

Figure 1:
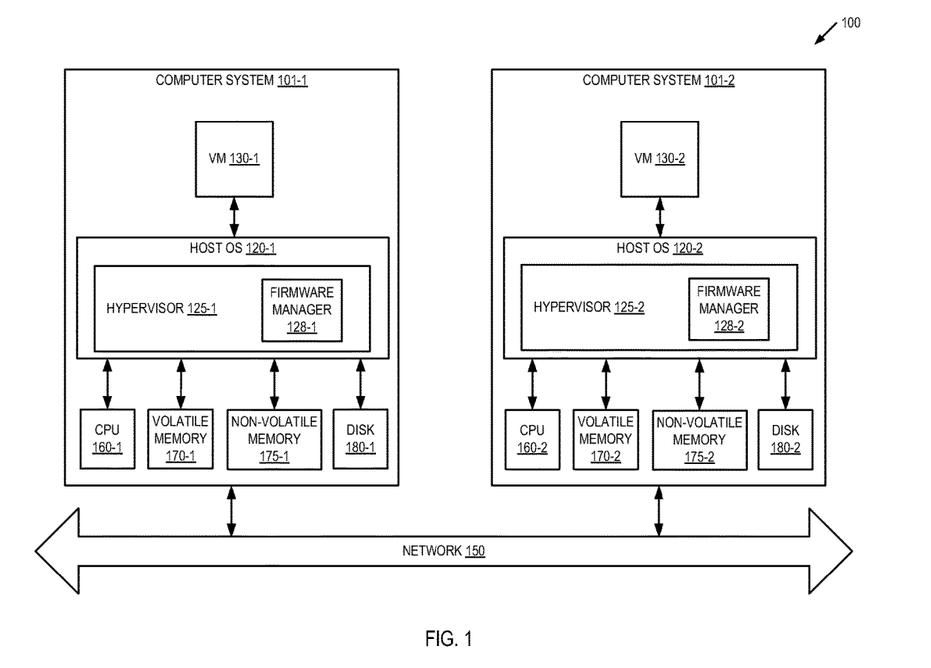
FIG. 1 depicts an illustrative system architecture, in accordance with the present disclosure.

FIG. 1 depicts an illustrative architecture of a computer system 100, in accordance with an example of the present invention. It should be noted that other architectures for computer system 100 are possible, and that examples of a system utilizing the disclosure are not necessarily limited to the specific architecture depicted by FIG. 1.

As shown in FIG. 1, computer system 100 comprises a first computer system 101-1 and a second computer system 101-2 connected via a network 150. Each of computer systems 101-1 and 101-2 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet). In some embodiments, computer systems 101-1 and 101-2 may belong to a cluster comprising additional computer systems not depicted in FIG. 1, while in some other embodiments, computer systems 101-1 and 101-2 may be independent systems that are capable of communicating via network 150.

Each of computer systems 101-1 and 101-2 comprises a central processing unit (CPU) 160, a volatile memory 170 (e.g., random access memory (RAM), etc.), non-volatile memory 175 (e.g., flash memory, etc.), and a disk 180 (e.g., one or more magnetic hard disk drives, one or more Universal Serial Bus [USB] solid-state drives, etc.). It should be noted that the fact that a single CPU is depicted in FIG. 1 for each of computer systems 101-1 and 101-2 is merely illustrative, and that in some other examples one or both of computer systems 101-1 and 101-2 may comprise a plurality of CPUs.

Computer system 101-1 runs a host operating system (OS) 120-1 that manages the hardware resources of the computer system and provides functions such as interprocess communication, scheduling, virtual memory management, and so forth. In one example, host operating system 120-1 also comprises a hypervisor 125-1, which provides a virtual operating platform for a virtual machine 130-1 and manages its execution.

Virtual machine 130-1 is a software implementation of a machine that executes programs as though it were an actual physical machine. In accordance with one example, hypervisor 125-1 includes a firmware manager 128-1 that is capable of locating firmware programs stored in non-volatile memory 175-1, obtaining metadata specifying capabilities of firmware programs (e.g., rotation counter support, nested subroutine call support, exception support, timer resolution in milliseconds, maximum number of global variables, etc.), receiving requests to migrate firmware programs to another computer system (e.g., computer system 101-2, etc.), transmitting queries to a hypervisor of another computer system (e.g., computer system 101-2, etc.) inquiring whether that hypervisor supports particular firmware capabilities, receiving such queries from a hypervisor of another computer system, issuing one or more commands to migrate firmware programs stored in non-volatile memory 175-1 and associated metadata to another computer system, and issuing one or more commands to migrate firmware programs and associated metadata from another computer system to computer system 101-1. Some operations of firmware manager 128-1 are described in detail below with respect to the methods of FIGS. 2 and 3.

It should be noted that in some alternative examples, hypervisor 125-1 may be external to host OS 120-1, rather than embedded within host OS 120-1. It should further be noted that in some alternative examples, firmware manager 128-1 may be external to hypervisor 125-1 (e.g., a module of host OS 120-1, middleware hosted by computer system 101-1 [not depicted in FIG. 1], etc.). It should further be noted that the fact that FIG. 1 depicts computer system 101-1 hosting a single virtual machine 130-1 is merely illustrative, and that in some alternative examples, computer system 101-1 may host a plurality of virtual machines. It should yet further be noted that in some examples, the metadata stored in non-volatile memory 175-1 is accessible to firmware manager 128-1, but is not accessible to any virtual machine (e.g., virtual machine 130-1, etc.) hosted by computer system 101-1. In addition to providing increased security, this approach allows the metadata to include attributes that may not conform with standard interfaces used by VMs to access firmware (for example, an attribute that specifies whether a specific version of the hypervisor is supported, etc.)

Computer system 101-2, like computer system 101-1, runs a host operating system (OS) 120-2 that manages the hardware resources of the computer system and provides functions such as interprocess communication, scheduling, virtual memory management, and so forth. In one example, host operating system 120-2 also comprises a hypervisor 125-2, which provides a virtual operating platform for a virtual machine 130-2 and manages its execution.

Virtual machine 130-2, like virtual machine 130-1, is a software implementation of a machine that executes programs as though it were an actual physical machine. In accordance with one example, hypervisor 125-2 includes a firmware manager 128-2 that is capable of locating firmware programs stored in non-volatile memory 175-2, obtaining metadata specifying capabilities of firmware programs (e.g., rotation counter support, nested subroutine call support, exception support, timer resolution in milliseconds, maximum number of global variables, etc.), receiving requests to migrate firmware programs to another computer system (e.g., computer system 101-1, etc.), transmitting queries to a hypervisor of another computer system (e.g., computer system 101-1, etc.) inquiring whether that hypervisor supports particular firmware capabilities, receiving such queries from a hypervisor of another computer system, issuing one or more commands to migrate firmware programs stored in non-volatile memory 175-2 and associated metadata to another computer system, and issuing one or more commands to migrate firmware programs and associated metadata from another computer system to computer system 101-2. Some operations of firmware manager 128-2 are described in detail below with respect to the methods of FIGS. 2 and 3.

It should be noted that in some alternative examples, hypervisor 125-2 may be external to host OS 120-2, rather than embedded within host OS 120-2. It should further be noted that in some alternative examples, firmware manager 128-2 may be external to hypervisor 125-2 (e.g., a module of host OS 120-2, middleware hosted by computer system 101-2 [not depicted in FIG. 1], etc.). It should further be noted that the fact that FIG. 1 depicts computer system 101-2 hosting a single virtual machine 130-2 is merely illustrative, and that in some alternative examples, computer system 101-2 may host a plurality of virtual machines. It should yet further be noted that in some examples, the metadata stored in non-volatile memory 175-2 is accessible to firmware manager 128-2, but is not accessible to any virtual machine (e.g., virtual machine 130-2, etc.) hosted by computer system 101-2. In addition to providing increased security, this approach allows the metadata to include attributes that may not conform with standard interfaces used by VMs to access firmware (for example, an attribute that specifies whether a specific version of the hypervisor is supported, etc.).

Figure 2:
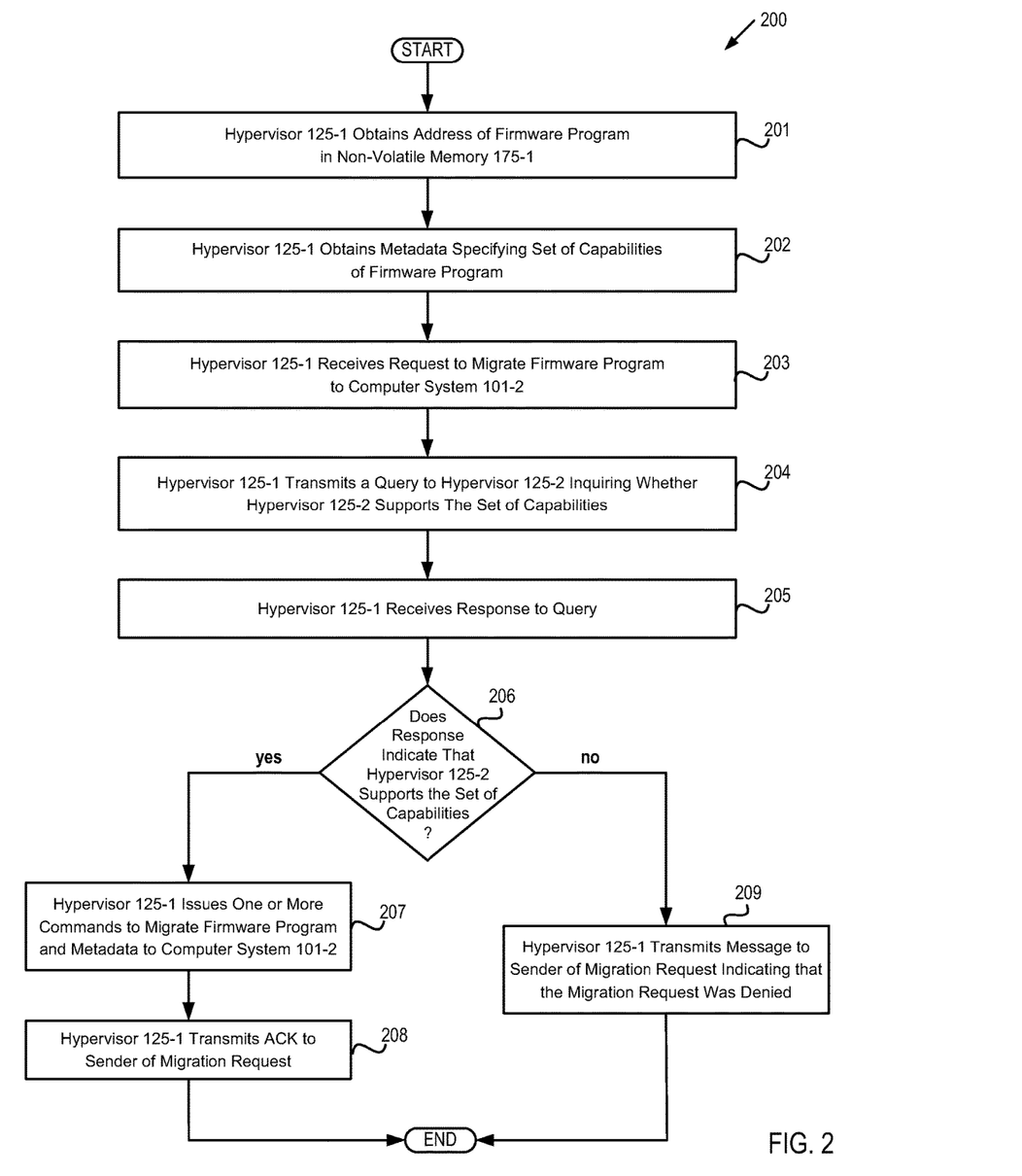
FIG. 2 depicts a flow diagram of an example of a method by which a computer system initiates migration of firmware program hosted by the computer system to another computer system, in a virtualized environment.

FIG. 2 depicts a flow diagram of an example of a method 200 by which a computer system initiates migration of firmware program hosted by the computer system to another computer system, in a virtualized environment. The method is performed by processing logic that may comprise hardware (circuitry, dedicated logic, etc.), software (such as is run on a general purpose computer system or a dedicated machine), or a combination of both. In one example, the method is performed by the computer system 101-1 of FIG. 1, while in some other examples, some or all of the method might be performed by one or more other machines. Similarly, in one example the method is performed by firmware manager 128-1 of computer system 101-1, while in some other examples, some or all of the method might be performed by some other module of computer system 101-1. It should be noted that blocks depicted in FIG. 2 can be performed simultaneously or in a different order than that depicted.

At block 201, hypervisor 125-1 obtains an address of a firmware program stored in non-volatile memory 175-1. In some examples, hypervisor 125-1 may transmit a request to host OS 120-1 to obtain the address, while in some other examples host OS 120-1 may provide the address to hypervisor 125-1 without any request from hypervisor 125-1, while in yet other examples hypervisor 125-1 may obtain the address in some other fashion. In one embodiment, block 201 is performed by firmware manager 128-1.

At block 202, hypervisor 125-1 obtains metadata specifying a set of capabilities of the firmware program. In some examples, the metadata may be stored in volatile memory 170-1 (e.g., as a list of property/value pairs, as a bit vector indicating which capabilities are present, etc.), while in some other examples, the metadata may be stored elsewhere (e.g., in a file on disk 180-1, etc.). In some examples, the location of the metadata (e.g., a memory address, etc.) may be provided to hypervisor 125-1 by host OS 125-1 at the same time as the address of the firmware program. In some examples, the metadata may be provided along with the firmware program by the author of the firmware program, while in some other examples, the host OS 120 may inspect the firmware program and generate and store the metadata, while in yet other embodiments, the metadata may be created and stored in some other fashion. In one embodiment, block 202 is performed by firmware manager 128-1.

At block 203, hypervisor 125-1 receives a request to migrate the firmware program to computer system 101-2. The request may be received by firmware manager 128-1 in response to a command submitted by an administrator (e.g., an administrator of host OS 120-1, an administrator of hypervisor 125-1, an administrator of computer system 101-1, an administrator of overall system 100, etc.), or in response to an application executing on computer system 101-1, or in response to some other program (e.g., a system administration-related script that executes on computer system 101-1, an application that executes on another machine connected to computer system 101-1 via network 150, etc.).

At block 204, hypervisor 125-1 transmits a query to hypervisor 125-2 inquiring whether hypervisor 125-2 supports the set of capabilities specified by the firmware metadata. In one example, the query is transmitted by firmware manager 128-1 to host OS 120-1, then via network 150 to host OS 120-2, and then to hypervisor 125-2.

At block 205, hypervisor 125-1 receives a response to the query. In one example, the response is transmitted by firmware manager 128-2 to host OS 120-2, then via network 150 to host OS 120-1, and then to hypervisor 125-1.

Block 206 branches based on the response received at block 205. If the response indicates that hypervisor 125-2 supports the set of capabilities, execution proceeds to block 207, otherwise execution continues at block 209.

At block 207, hypervisor 125-1 issues one or more commands to migrate the firmware program and firmware metadata to computer system 101-2. In some examples, hypervisor 125-1 may submit one or more commands to host OS 120-1 to migrate the firmware program and firmware metadata, while in some other examples, the one or more commands may be transmitted to computer system 101-2 and may instruct computer system 101-2 to perform the migration, while in yet other examples, the migration may involve some handshaking between computer systems 101-1 and 101-2 to perform the migration. In one embodiment, the one or more commands are issued by firmware manager 128-1.

At block 208, hypervisor 125-1 transmits an acknowledgment to the sender of the migration request. At block 209 (which is executed when hypervisor 125-2 does not support the set of capabilities of the firmware program), hypervisor 125-1 transmits a message to the sender of the migration request indicating that the migration request was denied. In some examples, the message may also indicate that hypervisor 125-2 does not support all of the capabilities of the firmware program, and, optionally, specify the particular capabilities that are not supported. In one embodiment, blocks 208 and 209 are performed by firmware manager 128-1.

Figure 3:
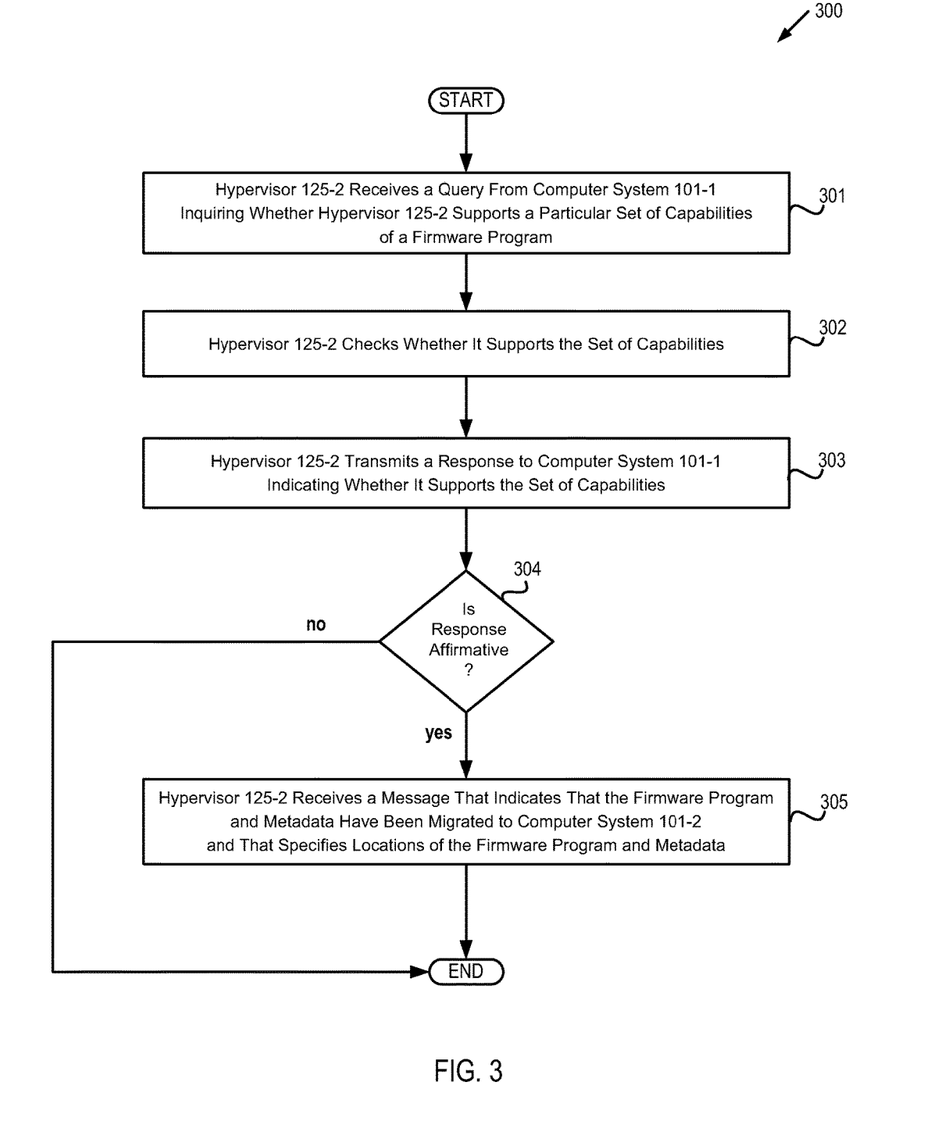
FIG. 3 depicts a flow diagram of an example of a method by which a computer system receives a firmware program that is migrated from another computer system, in a virtualized environment.

FIG. 3 depicts a flow diagram of an example of a method 300 by which a computer system receives a firmware program that is migrated from another computer system, in a virtualized environment. The method is performed by processing logic that may comprise hardware (circuitry, dedicated logic, etc.), software (such as is run on a general purpose computer system or a dedicated machine), or a combination of both. In one example, the method is performed by the computer system 101-2 of FIG. 1, while in some other examples, some or all of the method might be performed by one or more other machines. Similarly, in one example the method is performed by firmware manager 128-2 of computer system 101-2, while in some other examples, some or all of the method might be performed by some other module of computer system 101-2. It should be noted that blocks depicted in FIG. 3 can be performed simultaneously or in a different order than that depicted.

At block 301, hypervisor 125-2 receives a query from computer system 101-1 inquiring whether hypervisor 125-2 supports a particular set of capabilities of a firmware program hosted by computer system 101-1. In one example, the query is transmitted by firmware manager 128-1 to host OS 120-1, then via network 150 to host OS 120-2, and then to hypervisor 125-2.

At block 302, hypervisor 125-2 checks whether it supports the set of capabilities. In one example, the set of capabilities is specified in a system file (e.g., a system file of hypervisor 125-2, a system file of host OS 120-2, etc.). In some such examples, the system file may be created by hypervisor 125-2, while in some other examples, the system file may be created by host OS 120-2, while in still other embodiments, the system file may be created by some other entity. In one embodiment, block 302 is performed by firmware manager 128-2.

At block 303, hypervisor 125-2 transmits a response to computer system 101-1 indicating whether it supports the set of capabilities. In some examples, when hypervisor 125-2 does not support all of the capabilities, the response may also indicate which particular capabilities are not supported. In one embodiment, the response is transmitted by firmware manager 128-2 to host OS 120-2, then via network 150 to host OS 120-1, and then to hypervisor 125-1.

Block 304 branches based on whether the response transmitted at block 303 was affirmative. If so, execution proceeds to block 305, otherwise the method of FIG. 3 terminates. It should be noted that in some examples, when the response transmitted at block 303 is negative, hypervisor 125-2 may, prior to termination of the method, issue one or more commands to abort migration of the firmware program and metadata.

At block 305, hypervisor 125-2 receives a message that:
indicates that the firmware program and metadata have been migrated to computer system 101-2, and
specifies the address of the firmware program in non-volatile memory 175-2 and the location (e.g., an address in volatile memory 170-2, a file identifier, etc.) of the metadata.

In one example, firmware manager 128-2 receives the message from host OS 120-2.

Figure 4:
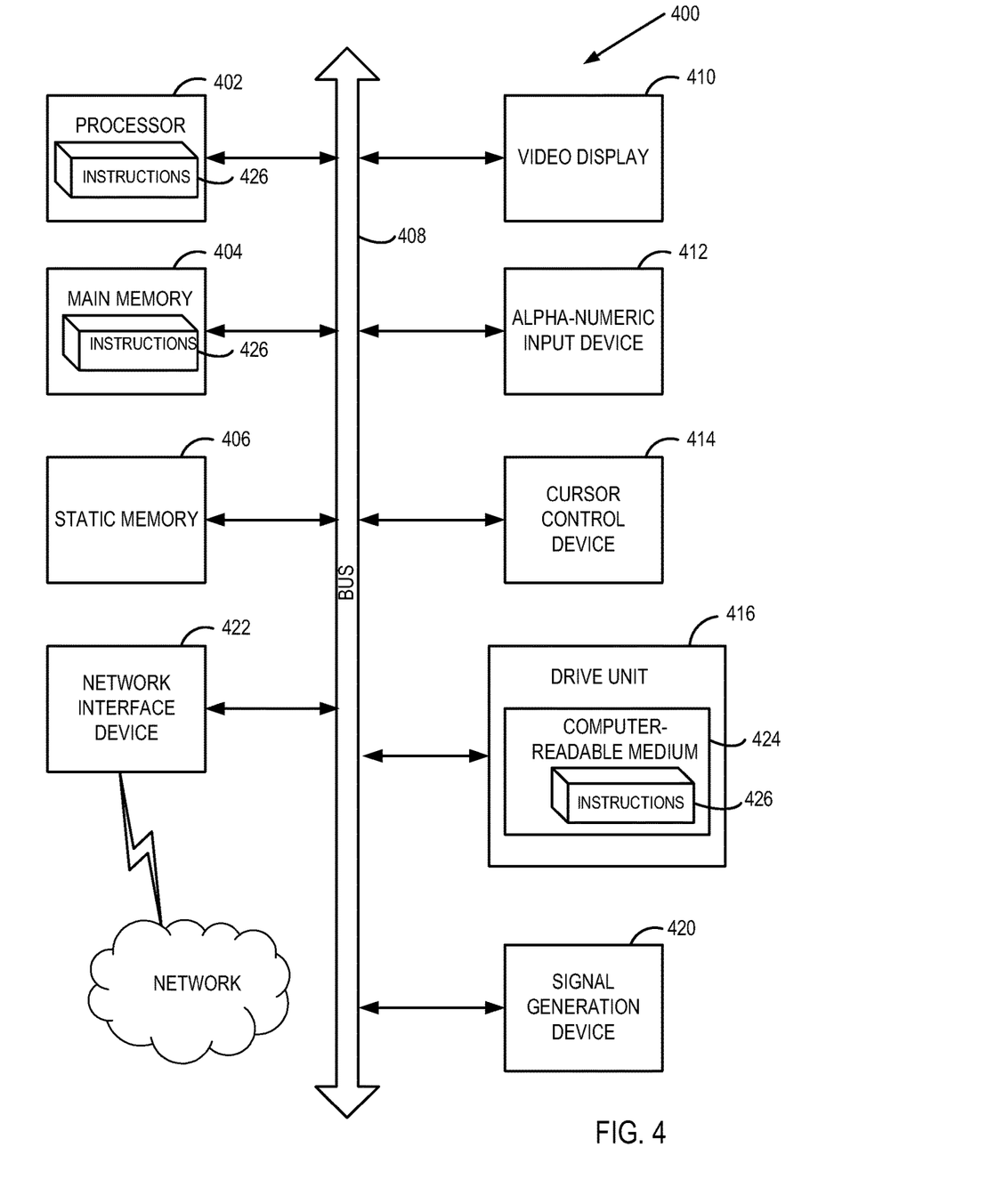
FIG. 4 depicts a block diagram of an illustrative computer system operating in accordance with examples of the invention.

FIG. 4 depicts an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the methods of FIGS. 2 and 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "transmitting", "obtaining", "issuing", "reading", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    obtaining, by a processing device of a computer system executing a hypervisor, an address of a firmware program that is stored in a memory of the computer system;
    obtaining, by the processing device of the computer system executing the hypervisor, metadata that specifies a set of capabilities associated with the hypervisor that are used by the firmware program, wherein the metadata is not accessible to any virtual machine hosted by the computer system;
    receiving a request to migrate the firmware program to a second computer system; and
    migrating, by the processing device of the computer system executing the hypervisor, the firmware program and the metadata from the computer system to the second computer system when each capability in the set of capabilities associated with the hypervisor that are used by the firmware program from the metadata is supported by a second hypervisor of the second computer system, wherein the firmware program and the metadata are stored in different memory locations at the second computer system after the migrating from the computer system.

2. The method of claim 1 wherein the metadata is stored in a volatile memory of the computer system.

3. The method of claim 1 wherein the metadata is provided to the hypervisor by a host operating system of the computer system.

4. The method of claim 1 wherein the obtaining of the metadata comprises:
    obtaining a file identifier of a file comprising the metadata; and
    reading the contents of the file.

5. The method of claim 1 further comprising:
    issuing by the processing device of the computer system executing the hypervisor, in response to the request, one or more commands to migrate the firmware program and the metadata to the second computer system.

6. The method of claim 5 further comprising:
    transmitting to the second hypervisor, a message that specifies the set of capabilities; and
    receiving, from the second hypervisor, a second message that indicates whether the second hypervisor supports the set of capabilities.

7. The method of claim 6 wherein the second hypervisor aborts the migrating of the firmware program and metadata when the second hypervisor does not support the set of capabilities.

8. A computer system comprising:
    a memory to store a firmware program; and
    a processing device, operatively coupled with the memory, the processing device to:
        obtain, by the processing device of the computer system executing a hypervisor, an address of the firmware program that is stored in the memory;
        obtain, by the processing device of the computer system executing the hypervisor, metadata that specifies a set of capabilities associated with the hypervisor that are used by the firmware program, wherein the metadata is not accessible to any virtual machine hosted by the computer system;
        receive a request to migrate the firmware program to a second computer system; and
        migrate the firmware program and the metadata from the computer system to the second computer system when each capability in the set of capabilities associated with the hypervisor that are used by the firmware program from the metadata is supported by a second hypervisor of the second computer system, wherein the firmware program and the metadata are stored in different memory locations at the second computer system after the migrating from the computer system.

9. The system of claim 8 further comprising a volatile memory to store the metadata.

10. The system of claim 8 wherein the metadata is provided to the hypervisor by an administrator.

11. The system of claim 8 wherein the obtaining of the metadata comprises:
    obtaining a file identifier of a file comprising the metadata; and
    reading the contents of the file.

12. The system of claim 8 wherein the processing device is further to:
    issue, by the processing device of the computer system executing the hypervisor, in response to the request, one or more commands to migrate the firmware program and the metadata to the second computer system.

13. The system of claim 12 wherein the processing device is further to:
    receive a message that specifies a second set of capabilities supported by the second hypervisor of the second computer system; and
    check whether each capability of the second set of capabilities is also in the set of capabilities.

14. The system of claim 13 wherein the processing device is further to abort the migrating of the firmware program and metadata when there is a capability of the second set of capabilities that is not in the set of capabilities.

15. A non-transitory computer readable storage medium, comprising instructions, which when executed, cause a processing device to:
    receive, by the processing device of a first computer system executing a hypervisor, a query from a second computer system inquiring whether the hypervisor supports a set of capabilities associated with another hypervisor that are used by a firmware program;

check, by the processing device of the first computer system executing the hypervisor, whether the set of capabilities is supported by the hypervisor of the first computer system;

transmit, to the second computer system, a response to the query indicating whether the set of capabilities is supported by the hypervisor of the first computer system; and migrate, by the processing device of the first computer system executing the hypervisor, the firmware program and metadata corresponding to the set of capabilities from the second computer system to the first computer system when the hypervisor of the first computer system supports each capability in the set of capabilities associated with the another hypervisor that are used by the firmware program, wherein the firmware program and the metadata are stored in different memory locations at the first computer system after the migrating from the second computer system.

16. The non-transitory computer readable storage medium of claim 15 wherein the set of capabilities is specified by metadata associated with the firmware program.

17. The non-transitory computer readable storage medium of claim 16 wherein the metadata is not accessible to any virtual machine hosted by the second computer system.

18. The non-transitory computer readable storage medium of claim 16 wherein the metadata is stored in a volatile memory of the second computer system.

19. The non-transitory computer readable storage medium of claim 15 wherein the processing device is further to:
receive, by the processing device of the first computer system executing the hypervisor, one or more messages that indicate that the firmware program and the metadata have been migrated to the first computer system.

20. The non-transitory computer readable storage medium of claim 19 wherein the one or more messages specify at least one of: a memory address of the first computer system in which the firmware program is stored, or a memory address of the first computer system in which the metadata is stored, wherein the metadata is not accessible to any virtual machine hosted by the first computer system.

* * * * *